US009088357B2

(12) United States Patent
Sevigny et al.

(10) Patent No.: US 9,088,357 B2
(45) Date of Patent: Jul. 21, 2015

(54) IMAGING SYSTEM FOR PASSIVE ALIGNMENT OF ENGINES

(71) Applicants: APPLIED MICRO CIRCUITS CORPORATION, Sunnyvale, CA (US); VOLEX PLC, London (GB)

(72) Inventors: Benoit Sevigny, Mountain View, CA (US); Ezra Gold, Sunnyvale, CA (US)

(73) Assignees: APPLIED MICRO CIRCUITS CORPORATION, San Diego, CA (US); VOLEX PLC, London (GB)

( * ) Notice: Subject to any disclaimer, the term of this patent is extended or adjusted under 35 U.S.C. 154(b) by 228 days.

(21) Appl. No.: 13/661,490

(22) Filed: Oct. 26, 2012

(65) Prior Publication Data

US 2014/0093250 A1    Apr. 3, 2014

Related U.S. Application Data

(60) Provisional application No. 61/707,434, filed on Sep. 28, 2012.

(51) Int. Cl.
| | | |
|---|---|---|
| *H04B 10/00* | (2013.01) | |
| *H04B 10/11* | (2013.01) | |
| *H04N 5/225* | (2006.01) | |
| *G01B 11/14* | (2006.01) | |
| *G02B 6/42* | (2006.01) | |
| *H04B 10/114* | (2013.01) | |
| *G01B 11/26* | (2006.01) | |

(52) U.S. Cl.
CPC ............... *H04B 10/11* (2013.01); *G01B 11/14* (2013.01); *G01B 11/26* (2013.01); *G02B 6/4219* (2013.01); *H04B 10/114* (2013.01); *H04N 5/225* (2013.01)

(58) Field of Classification Search
CPC ............... H04B 10/11–10/116; H04B 10/225; H04B 10/25–10/2507; H04B 10/80–10/803; G02B 6/2555; G02B 6/2556; G02B 6/3588; G02B 6/3652; G02B 6/32–6/3508; G02B 6/38–6/3806; G02B 6/3834–6/385; G02B 6/3873–6/3886
USPC .......................................... 398/118–131, 156
See application file for complete search history.

(56) References Cited

U.S. PATENT DOCUMENTS

| | | | |
|---|---|---|---|
| 3,930,732 A | 1/1976 | Holly | |
| 4,736,100 A | 4/1988 | Vastagh | |
| 5,980,120 A * | 11/1999 | Narayanan | ...................... 385/89 |
| 6,367,989 B1 * | 4/2002 | Hartman et al. | ................. 385/89 |
| 6,661,546 B1 * | 12/2003 | Plett | ................................ 359/15 |
| 6,896,421 B2 | 5/2005 | Monson et al. | |
| 6,910,812 B2 | 6/2005 | Pommer et al. | |
| 8,169,603 B2 | 5/2012 | Lee et al. | |
| 8,301,027 B2 * | 10/2012 | Shaw et al. | ..................... 398/88 |
| 2003/0048448 A1 | 3/2003 | Fleming et al. | |
| 2003/0234924 A1 | 12/2003 | Ono | |
| 2004/0052465 A1 * | 3/2004 | Verbana et al. | ................. 385/49 |
| 2004/0165892 A1 * | 8/2004 | Mendenhall | .................. 398/118 |
| 2004/0208439 A1 * | 10/2004 | Bell et al. | ......................... 385/32 |
| 2004/0258415 A1 * | 12/2004 | Boone et al. | ................. 398/125 |
| 2005/0184227 A1 | 8/2005 | Kuu et al. | |
| 2006/0018216 A1 * | 1/2006 | Morris et al. | ................ 369/47.1 |

(Continued)

*Primary Examiner* — Li Liu

(74) *Attorney, Agent, or Firm* — Baker & Hostetler LLP

(57) ABSTRACT

Methods and systems for facilitating alignment of optical systems and optoelectronic systems are disclosed here. The methods and systems include passively detecting images, determining relative positions of components and aligning components. An imaging component can detect images and determine relative positions and repositioning instructions.

15 Claims, 9 Drawing Sheets

(56) References Cited

U.S. PATENT DOCUMENTS

2006/0062099 A1* 3/2006 Yazaki et al. ............ 369/44.11
2006/0221345 A1 10/2006 Hiiro
2010/0014854 A1 1/2010 Healey et al.

* cited by examiner

IMAGING SYSTEM FOR PASSIVE ALIGNMENT OF ENGINES

CROSS-REFERENCE TO RELATED APPLICATIONS

This application is based upon and claims the benefit of priority from the prior U.S. Provisional Patent Application 61/707,434, filed on Sep. 28, 2012, the entire contents of which are incorporated herein by reference.

TECHNICAL FIELD

This disclosure relates to electromagnetic communication systems and methods. More particularly, to expanded beam connectors with targeted parameters in optical communication systems and methods.

BACKGROUND

Advances in technology have made communication using electromagnetic waves the most reliable and fastest ways of communicating information between points. In general, electromagnetic communication systems generate information at a source (e.g., transmitter). Information is transmit as a signal through a channel, such as free space in radio applications, electronic lines in telephone and internet applications, or optic fibers in fiber optic applications. During transmission, a channel propagating information usually induces loss in a signal and/or distorts the signal. Likewise, various other mechanics may introduce noise in a signal. A signal is typically received by a receiver which can utilize and/or decode the signal.

In a general, optical fiber based communication systems transmits optical signals to, or receives optical signals from, one or more optical fibers. The optical fibers are affixed (e.g., via epoxy) or mated in a fiber optic connector that positions the ends of the optical fibers in close proximity to the optoelectronic component. In many systems, a lens is used to focus optical signals emitted from a optic fiber.

Optoelectronic component must be aligned relative to a lens, and a lens must be aligned relative to the end of a optical fiber. If the optical transmission path is not aligned, a quality of the optical communication can be degraded or an optic signal can be completely lost. Aligning the optoelectronic device, the lens, and the core of the optical fiber can be difficult because of the small dimensions and low fault tolerances in systems.

Today, devices can achieve the required alignment. However, such devices suffer from one or more shortcomings. The shortcomings typically involve increases in time, inability to automate, increases in cost, or low precision. In many cases, an entire optical system is assembled, then it is discovered that the components are not aligned and the system must be discarded or reassembled.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods for passive alignment of components in optoelectronic systems. In an aspect, the systems and/or methods can allow to simultaneously alignment of components and imaging of components. For instance, optical fibers can image a component at one end, while aligning to the component at another. Likewise, a collimate beam can also be used to align optoelectronic components, without the need to assemble and/or engage an engine in active use.

In one example, optical fiber ends are observed with an imaging system while optoelectronic components are positioned relative to the optic fibers. The optoelectronic components can be aligned to a tolerance by correlating observations made by the imaging system and relative positions of optical fibers and optoelectronic components. Once it is determined that optical fibers and optoelectronic components are aligned to a tolerance, then the optical fibers and optoelectronic components can be joined. In one implementation, joining comprises physically contacting optical fibers with the optoelectronic components and binding together with an epoxy or similar substance. In various other examples, joining can include the use of connectors, physical contact (PC) connectors, expanded beam connectors, splicers, couplers, splitters, tap ports, stitches, and wavelength-division multiplexers.

In another example, an alignment system and/or method can be configured for collimating beams and observing the collimated beams with an imaging system while positioning optoelectronic components relative to an optical engine design. In one aspect, a collimating component can directly image the components through an optical system. As the collimated beams are imaged, optoelectronic components can be positioned according to aspects of the collimated beams. In another aspect, the optoelectronic components and collimating components can be affixed into a position, and an engine can be assembled according to the alignment system.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
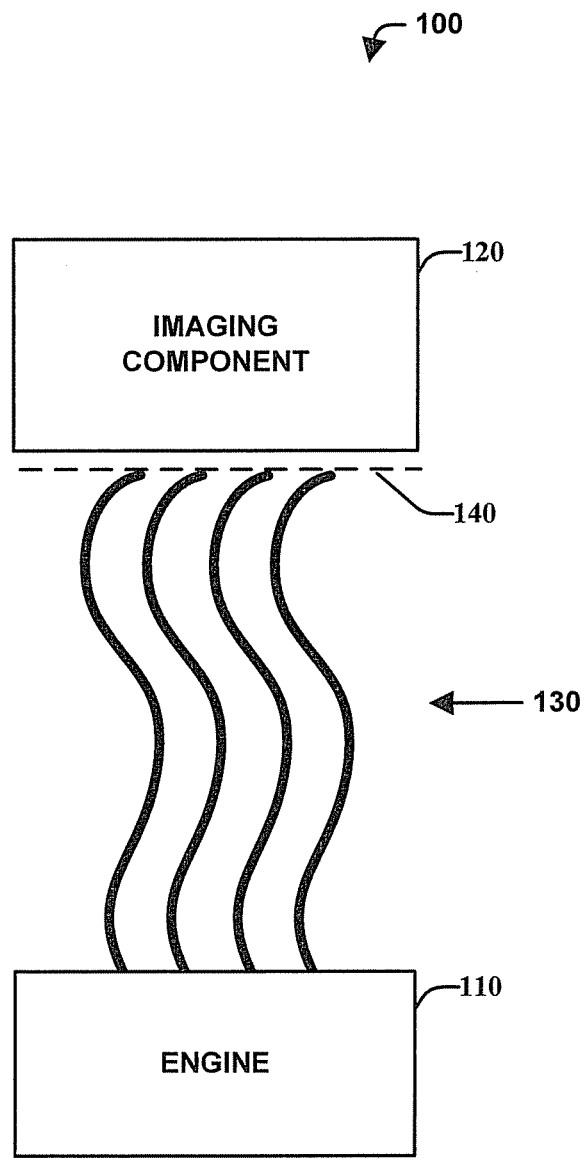
FIG. 1 illustrates an exemplary alignment system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As utilized herein, terms "component," "system," "data store," "engine," "optoelectronic component", "template," "manager," "network," "profile," and the like are intended to refer to a computer-related entity, either hardware, software (e.g., in execution), and/or firmware. For example, a component can be a process running on a processor, a processor, an object, an executable, a passive optical device, an optical device, an electronic device, a holographic device, a mechanical device, a function, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The terms "signal", "optical signal", "beam", "optical beam" and the like are intended to encompass an electromagnetic signal in various forms and can include signals along the electromagnetic spectrum. For brevity, this disclosure refers to the various systems and methods as relating to optical systems and/or methods. In addition, the terms "carrier", "cable", "optical fiber", "optic fiber", "fiber", "free space" and the like, are intended to encompass mediums which allow propagation of electromagnetic signals. As such, the above should not be seen as to limit to optical systems and/or methods. For example, a carrier may be a braided copper wire allowing propagation of electromagnetic signals. The terms "lens", "optic lens", "beam expander", "refocusing component" and the like are intended to encompass holographic devices, mechanical devices, mirrors, convex and/or concave lenses, plastic lenses, glass lenses, and the like. Of course, those skilled in the art will recognize many modifications may be made to this configuration without departing from the scope or spirit of the claimed subject matter. Additionally, the terms "communication system", "communication method", "communication", "propagate", "send", and the like are intended to encompass any transmission of a signal, over any distance, and through any carrier. For example, a communication system can be between a relatively short distance from one integrated circuit to another integrated circuit or relatively large distances, such as metric kilometers between telecommunication stations.

Moreover, the word "exemplary" is used herein to mean serving as an example, instance, or illustration. Any aspect or design described herein as "exemplary" is not necessarily to be construed as preferred or advantageous over other aspects or designs.

Referring now to FIG. 1, a high level functional block diagram of an alignment system 100 capable of passively aligning an array of optoelectronic components to an optical system is illustrated in accordance with various embodiments presented herein. System 100 comprises an engine 110, imaging component 120, carriers 130, and plane 140. It is appreciated that additional components are inherent to system 100 but are not illustrated for simplicity and readability.

In one implementation, engine 110 can be an assembly of optical components, substrates, optoelectronic components, electronic components, mechanical components, and/or optical assemblies. In other implementations, engine 110 can comprise optoelectronic components to be coupled to carriers 130. For example, engine 110 can simultaneously comprise a number of substrates to be assembled into a system, a number of substrates assembled into a system, a number of substrates to be assembled with a set of assembled substrates, and the like.

Further, engine 110 can include transmitters and circuitry capable of transforming input to an optical signal, such as substrate/optoelectric components, electrical interfaces, component arrays, data encoders, modulators (amplitude modulation, frequency modulation, and/or digital modulation), and light sources, for example. In one aspect, engine 110 includes one or more light emitting source, such as a laser diode (LD), light emitting diode (LED), surface-emitting LEDs (SLEDs), edge-emitting LEDs (ELEDs), Fabry-Perot (FP) LDs, buried hetro (BH) LDs, multi-quantum will (MQW) LDs, distributed feedback (DFB) LEDs, and the like. A light emitting source can produce light signals by transforming electrical, or other signals, into an optical signal. In another aspect, engine 110 can receive an optic signal. In one example, engine 110 can comprise a receiver, detectors, such as PIN photodiode or avalanche photodiode, comprising silicon, indium gallium arsenide, or germanium, decoders, demodulators, amplifiers, electrical interfaces, and other circuitry.

System 100 is illustrated as including four carriers 130. However, it is appreciated that carriers 130 can comprise n optical fibers or various types, where n is a real integer. In another aspect, carriers 130 can comprise grade indexed fiber. However, carriers 130 can comprise single-mode fiber, multi-mode fiber, step-index fiber, and the like. In various other examples, carriers 130 can comprise one or more of simplex cable construction, duplex zipcord cable construction, multi-fiber breakout cable construction, hybrid cable construction, optical ribbon construction, submarine cable construction and the like.

In one implementation, carriers 130 can terminate at plane 140. Terminal ends of carriers 130 can form an image at plane 140. For example, images can propagate through carriers 130 to their terminal ends at plane 140. At plane 140, imaging component 120 can observe images formed at terminal ends of carriers 130.

Imaging component 120 can be a system used to image optical signals at plane 140. In various implementation, imaging component 120 can comprise electronic components, digital cameras, magnifying glasses, microscope, image recording device, a human eye, a processor coupled to imaging components, remote imaging components, direct imaging components, and the like.

In another aspect, imaging component 120 can recognize patterns. In one example, imaging component can store known patterns and compare images formed at terminal ends of carriers 130 to detect patterns. In various implementations, imaging component can detect patterns via fuzzy logic, clustering algorithms, regression algorithms, categorical sequencing, real-valued sequencing, parsing algorithms, ensemble learning algorithms, classification algorithms, pattern matching, hash tables, hidden Markov models, and the like.

As such, imaging component 120 can recognize patterns associated with components of engine 110. In one aspect, imaging component 120 can recognize full or partial patterns. Imaging component 120 can utilize libraries, tables, and the like to store and/or evaluate patterns.

Furthermore, imaging component 120 can determine a relative position between various components comprised in engine 110 and carriers 130 according to images detected at plane 140. In one aspect, relative positions are determined based on pattern recognition. In another aspect, relative positions can be learned according to data associated with past alignments.

In another aspect, imaging component 120 is configured for determining a position of components comprised in engine 110 relative to carriers 130 and/or relative to other components comprised in engine 110. A relative position can comprise a three dimensional position in an x-axis, y-axis, and z-axis, for example.

In an implementation, imaging component 120 can determine a target position. The target position can be used to alter relative positions of components comprised in engine 110 and carriers 130. In one example, a target position can contain a threshold fault tolerance. For example, various embodiments of system 100 may require fault tolerances of various magnitudes and/or ranges (e.g., a distance between components of j nanometers in any direction, where j is a real number).

In another implementation, imaging component 120 can determine instructions to alter relative positions of components comprised in engine 110 and carriers 130, according to a target position and/or determined relative positions. For example, imaging component 120 can translate positional information and determine distances (in an x-axis, y-axis, and/or z-axis) components comprised in engine 110 and/or carriers 130 must be moved. Accordingly, imaging component 120 can determine information to align various components of system 100.

Imaging component 120 can send alignment information to reposition components comprised in engine 110. Sending alignment information can comprise, displaying to an interface, transmitting to mechanical systems, electronic systems, optoelectronic systems, and/or various systems configured for processing alignment information to cause repositioning of components comprised in engine 110 and/or carriers 130.

Figure 2:
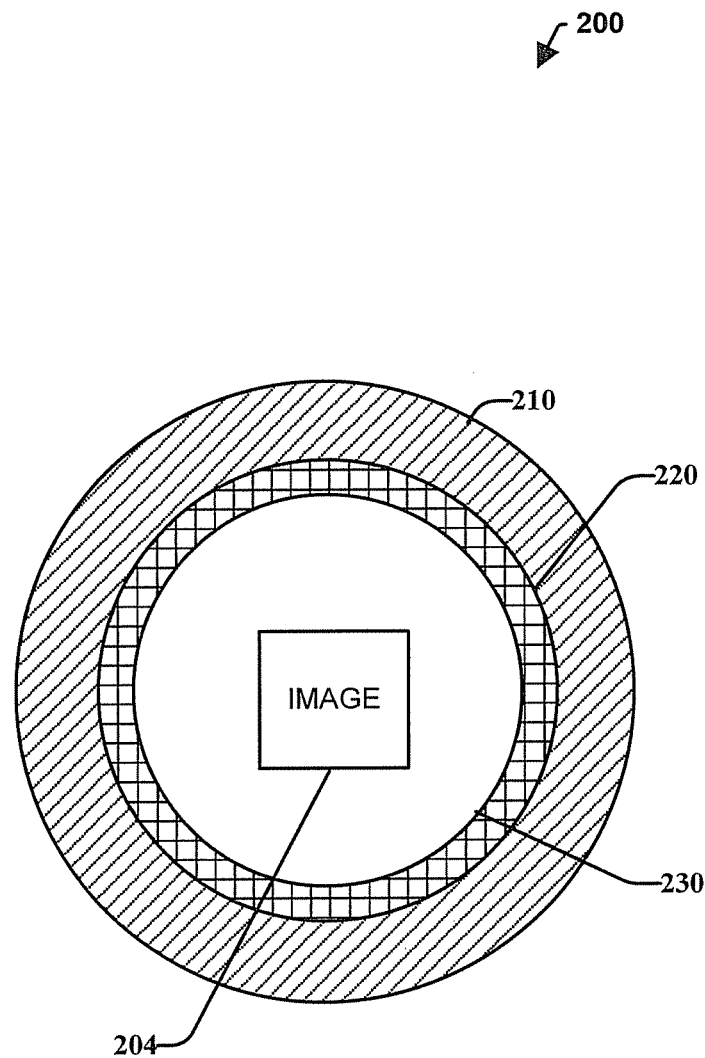
FIG. 2 illustrates an enlarged cross sectional diagram of an exemplary device that facilitates identification of images and image locations.

In another implementation, comprised in engine 110 and/or carriers 130 can be randomly repositioned until a target alignment is achieved. It is appreciated that various components in engine 110 and/or carriers 130 can be simultaneously or independently aligned. Referring next to FIG. 2, an illustration of an exemplary optical fiber carrying an optical signal in accordance with an aspect of the subject specification is provided. As illustrated, an optical system 200 includes a buffer component 210, a cladding component 220, and a fiber end surface component 230 forming an image 204. Here, it should be appreciated that optical system 200 may be implemented as multi-mode fiber, micro-structured fiber (e.g., photonic-crystal fiber (PCF), multicore). In various other implementations, single mode fiber or custom designed fibers may be utilized with advanced control algorithms. Similarly, it should be further appreciated that each of components 210, 220, and 230 can be implemented as single devices and/or multiple devices.

Further, optic system 200 is illustrated as simplex cable for simplicity and readability, and should be read to include duplex zipcord cables, multifiber breakout cables, hybrid cables, optical ribbon cables, submarine cables, and the like. Additionally, fiber end surface component 230 is understood to be a surface on a fiber optic core, beam expansion component, passive optical component, lens, and/or other applicable optical component. As such, optical system 200 can include addition buffer, cladding, and fiber end surface components.

In an embodiment, buffer component 210 provides insulation and protection for a fiber core. In one aspect, buffer component 210 can be of a plastic or rubber construction. In some implementations, buffer component 210 may be stripped to expose portions of cladding component 220 and/or a fiber optic core.

Cladding component 220 can reflect optical signals back into a fiber optic core. In one aspect, the cladding component is the same material as a fiber optic core (e.g., doped glass or silica). However, cladding component can be a different material than that of a fiber optic core. In another aspect, cladding component comprises a material with a refractive index of a disparate value than a fiber optic core.

Fiber end surface component 230 represents a terminal end of a fiber optic core. Fiber end surface component 230 can be a direct end of a fiber optic core, a polished end, a lens, a component of a connector (beam expansion component), and the like. Fiber end surface component 230 is drawn for simplicity, without addition structures (such as a connector housing or ferrules). At another end, system 200 can terminate at a position relative to optoelectronic components to be coupled/joined to system 200.

In one example, image 204 can be formed at end surface component 230. Image 204 can comprise an image corresponding to information received at another end of system 200. In one aspect, image 204 can comprise an image of optoelectronic components, whether the image is a whole or partial image.

In this example, image 204 can be detected by an imaging component such as a human eye, camera, electronic device, mechanical device, holographic device, and the like. Image 204 can be recognized as associated with optoelectronic components. As such, an imaging device can determine a relative position of the associated optoelectronic component and an end of system 200. Alignment information can be determined based on the relative positioning and the optoelectronic component and/or end of system 200 can be repositioned in accordance with the alignment information.

Figure 3:
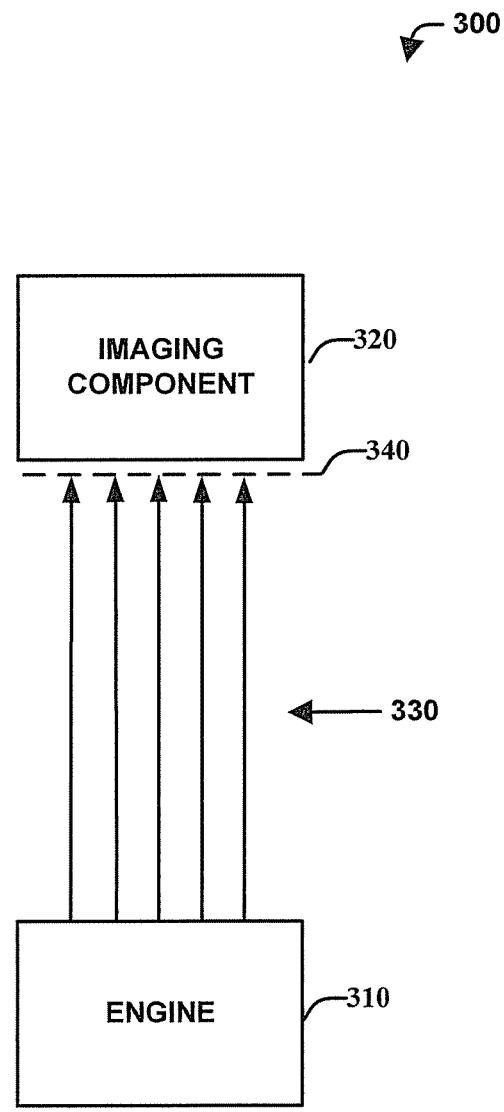
FIG. 3 illustrates an exemplary alignment system utilizing optical beams in accordance with an aspect of the subject specification.

Referring next to FIG. 3, a high level functional block diagram of an alignment system 300 capable of passively aligning an array of optoelectronic components to an optical system with collimated beams is illustrated in accordance with various embodiments presented herein. System 300 comprises an engine 310, imaging component 320, collimated beams 330, and plane 340. It is appreciated that additional components are inherent to system 300 but are not illustrated for simplicity and readability.

In one implementation, engine 310 can be an assembly of optical components, substrates, optoelectronic components, electronic components, mechanical components, and/or optical assemblies. In other implementations, engine 310 can comprise optoelectronic components capable of generating collimated beams 330. For example, engine 310 can simultaneously comprise a number of substrates to be assembled into a system, a number of substrates assembled into a system, a number of substrates to be assembled with a set of assembled substrates, and the like.

Further, engine 310 can include transmitters and circuitry capable of transforming input to an optical signal, such as substrate/optoelectric components, electrical interfaces, component arrays, data encoders, modulators (amplitude modulation, frequency modulation, and/or digital modulation), and light sources, for example. In one example, engine 310 can comprise a receiver, detectors, such as PIN photodiode or avalanche photodiode, comprising silicon, indium gallium arsenide, or germanium, decoders, demodulators, amplifiers, electrical interfaces, and other circuitry.

In another aspect, engine 310 includes one or more light emitting source, such as a laser diode (LD), light emitting diode (LED), surface-emitting LEDs (SLEDs), edge-emitting LEDs (ELEDs), Fabry-Perot (FP) LDs, buried hetero (BH) LDs, multi-quantum will (MQW) LDs, distributed feedback (DFB) LEDs, and the like. A light emitting source can produce light signals by transforming electrical, or other signals, into an optical signal.

In one aspect, engine 310 comprises light sources generating collimated beams. A collimated beam is light with parallel rays. The rays of a collimate beam spreads slowly as the beam propagates. While, laser light from gas or crystal lasers naturally collimates, LDs do not naturally emit collimated light. Accordingly, when using LD sources, engine 110 can include collimating lenses that collimates the LD into collimated beams 330. The collimating lenses can include parabolic mirrors, spherical mirrors, or other types of lenses that produce collimated light from point-like sources.

System 300 is illustrated as including four collimated beams 330. However, it is appreciated that collimated beams can comprise m collimated beams, where m is a real integer. Further, collimated beams 330 can comprise optical signals capable of carrying image information. In one example, collimated beams 330 can be modulated and/or encoded (e.g., AM, FM, Wavelength modulation). Collimate beams 330 can be refocused (demodulated and/or decoded) at plane 340 by imaging component 320.

Imaging component 320 can be a system used to image optical signals at plane 340. In various implementation, imaging component 320 can comprise electronic components, digital cameras, magnifying glasses, microscope, lenses, optoelectronic components, telescopic components, image recording device, a human eye, a processor coupled to imaging components, remote imaging components, direct imaging components, and the like.

In another aspect, imaging component 320 can recognize patterns and/or recognize characteristics of collimated beams 330. In one example, imaging component can store known patterns and compare images formed by information collected from collimated beams 330 to detect patterns. In various implementations, imaging component can detect patterns via fuzzy logic, clustering algorithms, regression algorithms, categorical sequencing, real-valued sequencing, parsing algorithms, ensemble learning algorithms, classification algorithms, pattern matching, hash tables, hidden Markov models, and the like.

In another example, imaging component 320 can determine a focal point according to characteristics of collimated beams 330. In one aspect, imaging component can detect scattering, loss, beam diameter, and the like to determine the focal point.

Furthermore, imaging component 320 can determine a relative position between various components comprised in engine 310 and a focal point according to images detected at plane 340. In one aspect, relative positions are determined based on pattern recognition and/or beam characteristics. In another aspect, relative positions can be learned according to data associated with past alignments. A relative position can comprise a three dimensional position in an x-axis, y-axis, and z-axis, for example.

In an implementation, imaging component 320 can determine a target position. The target position can be used to alter relative positions of components comprised in engine 310 and a focal point. In one example, a target position can contain a threshold fault tolerance. For example, various embodiments of system 300 may require fault tolerances of various magnitudes and/or ranges (e.g., a distance between components of j nanometers in any direction, where j is a real number).

In another implementation, imaging component 320 can determine instructions to alter relative positions of components comprised in engine 310 and collimated beams 330, according to a target position and/or determined relative positions. For example, imaging component 320 can translate positional information and determine distances (in an x-axis, y-axis, and/or z-axis) components comprised in engine 310. Accordingly, imaging component 320 can determine information to align various components of system 300. In one aspect, imaging component 320 ensures that all components comprised in engine 310 are within a target closeness to a focal point.

In another example Imaging component 320 can send alignment information to reposition components comprised in engine 310. Sending alignment information can comprise, displaying to an interface, transmitting to mechanical systems, electronic systems, optoelectronic systems, and/or various systems configured for processing alignment information to cause repositioning of components comprised in engine 310 and/or a focal point.

In another implementation, comprised in engine 310 can be randomly repositioned until a target alignment is achieved. It is appreciated that various components in engine 310 can be simultaneously or independently aligned.

Figure 4:
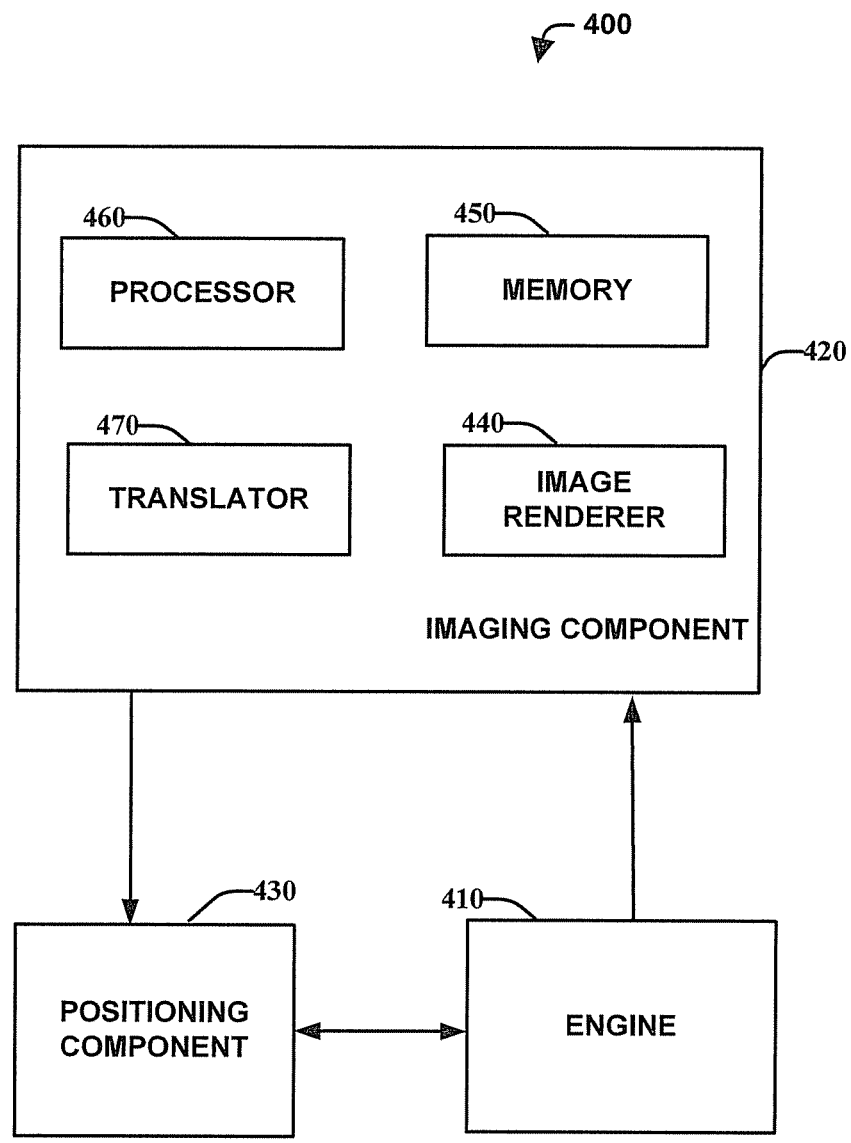
FIG. 4 is a high level block diagram illustrating an exemplary illustrates an exemplary alignment system in accordance with an aspect of the subject specification.

Turning to FIG. 4, a high level functional block diagram of an alignment system 400 capable of passively aligning optoelectronic components in an optoelectronic system is illustrated in accordance with various embodiments presented herein. System 400 comprises an engine 410, imaging component 420, and positioning component 430. Furthermore, imaging component 420 can comprise image render component 440, memory component 450, processor component 460, and translator component 470. It is appreciated that additional components are inherent to system 400 but are not illustrated for simplicity and readability.

In one implementation, engine 410 can be an assembly of optical components, substrates, optoelectronic components, electronic components, mechanical components, and/or optical assemblies. In other implementations, engine 410 can comprise optoelectronic components capable of generating collimated beams 430. For example, engine 410 can simultaneously comprise a number of substrates to be assembled into a system, a number of substrates assembled into a system, a number of substrates to be assembled with a set of assembled substrates, and the like.

In another aspect, engine 410 can comprise one or more light emitting source, such as a laser diode (LD), light emitting diode (LED), surface-emitting LEDs (SLEDs), edge-emitting LEDs (ELEDs), Fabry-Perot (FP) LDs, buried hetro (BH) LDs, multi-quantum will (MQW) LDs, distributed feedback (DFB) LEDs, and the like. A light emitting source can produce light signals by transforming electrical, or other signals, into an optical signal.

Information can be transmitted (actively or passively) from ending 410 to imaging component 420. In one implementation, image information is propagated through one or more optic fibers. In another implementation, information is propagated through free space via a collimated beam. In an aspect, information can comprise data pertaining to a position of various components comprising engine 410.

Image renderer component 440 can receive, decode, and/or demodulate information pertaining to a relative position of various components comprising engine 410.

Processor 460 is capable of executing various components stored in a computer readable memory 450. Memory 450 can store information, libraries containing patterns, and the like. In one aspect, processor 460, is capable of identifying patterns, determining characteristics of optical signals, and/or processing information received from engine 410.

Translator component 470 is configured for translating received information and determining a relative position of components comprising engine 410 to optical fibers and/or focal points. In another aspect, translator component 470 can generate repositioning instructions to facilitate alignment of components comprised engine 410 and/or other optoelectronic components in system 400 within a target range.

In an implementation, imaging component can transmit information to positioning component 430. In various implementations, information can be directly transmitted, can be displayed on an interface, and or indirectly transmitted to position component 430.

Positioning component 430 is capable of receiving information containing instructions to reposition components comprised in engine 410. In one example, instructions include data pertaining to altering one or more dimensional positions. Positioning component 430 can process the data and facilitate altering the relative positions of components comprising engine 410 according to the one or more dimensional positions.

As such, positioning component 430 can comprise various electronic, optoelectronic, and mechanical components capable of manipulating relative positions of engine 410's components, optical fibers, and other various components.

In one example, positioning component 430 repositions components, and updated information is transmitted to imaging component 420. Imagining component 420 can then determine if relative positions of components in system 400 are aligned within a predefined fault tolerance.

Figure 5:
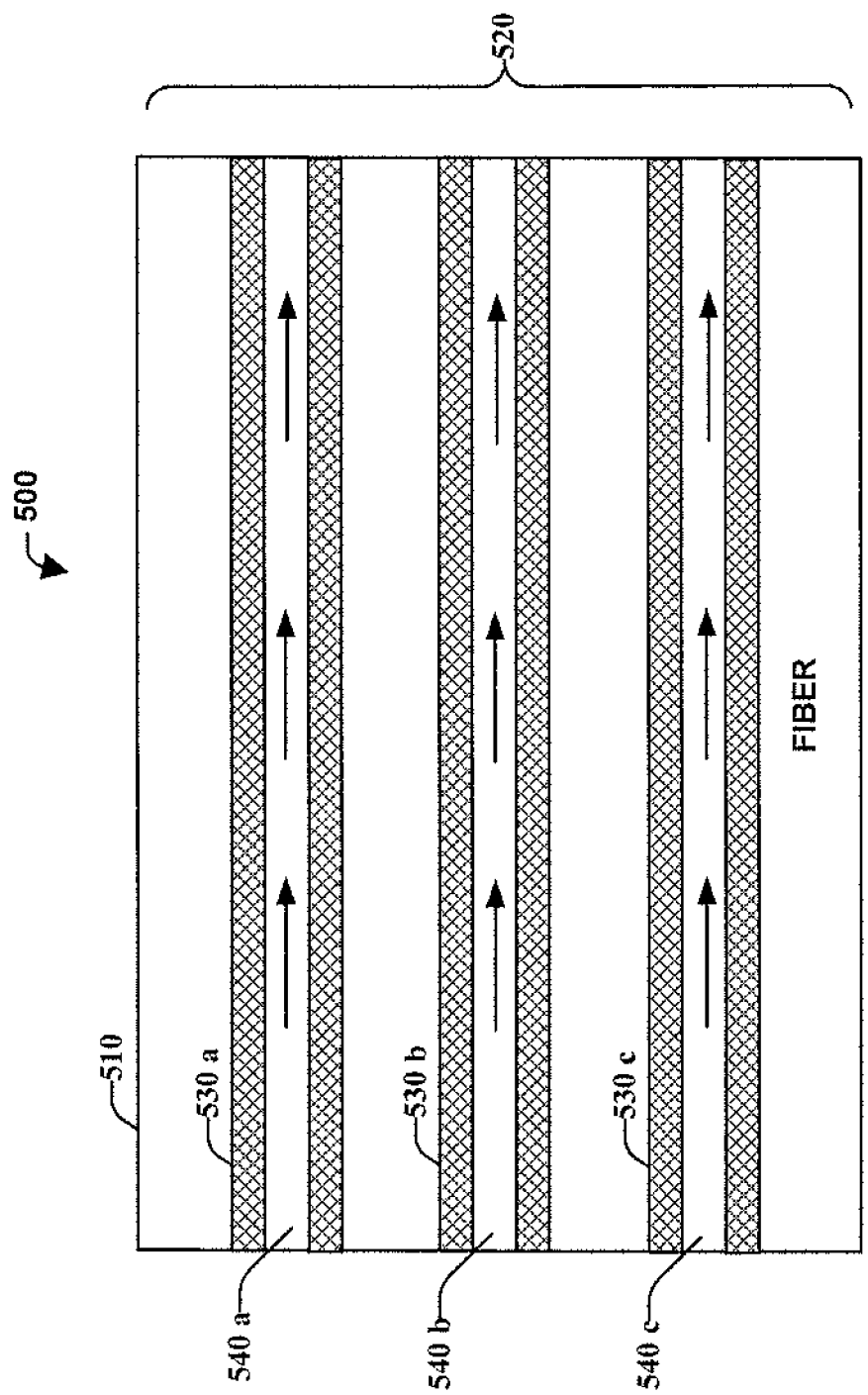
FIG. 5 is enlarged cross sectional diagram of an exemplary device that facilitates simultaneous identification of a plurality images and image locations.

Turning to FIG. 5, is a fragmented cross-sectional view of an optic fiber 500 in accordance with various aspects of this disclosure is provided. Optic fiber 500 includes a body 510, pathways 530 (*a, b, c*), optic cores 540 (*a, b, c*), and terminal end 520. While optic fiber 500 is illustrated as comprising three optic cores 540 (*a, b, c*) and three pathways 540 (*a, b, c*), it is appreciated that optic fiber 500 can comprise a j optic cores and k optic fibers, wherein j and k are real integers.

Pathways 530 (*a, b, c*) can be configured to allow fiber optic cores of various sizes to pass through body 510. Additionally, pathways 530 (*a, b, c*) can allow for various barriers and materials to pass through body 510.

In one aspect, fiber cores 540 (*a, b, c*) can each propagated data, in the form of images (e.g., optic signals) to terminal end 520. Data can be collected at terminal end 520 by an imaging component, for example. In one aspect, each fiber core 540 (*a, b, c*) can for images at terminal end 520 of distinct optoelectronic components.

In another example, each fiber core 540 (*a, b, c*) can form a portion of one or more optoelectronic components. In one aspect, images can propagated through optoelectronic fiber cores 540 (*a, b, c*) to terminal end 520 and be received by an imaging device. The imaging device can correlate the images to determine a position of the optoelectronic components relative to optic fiber 500.

Figure 6:
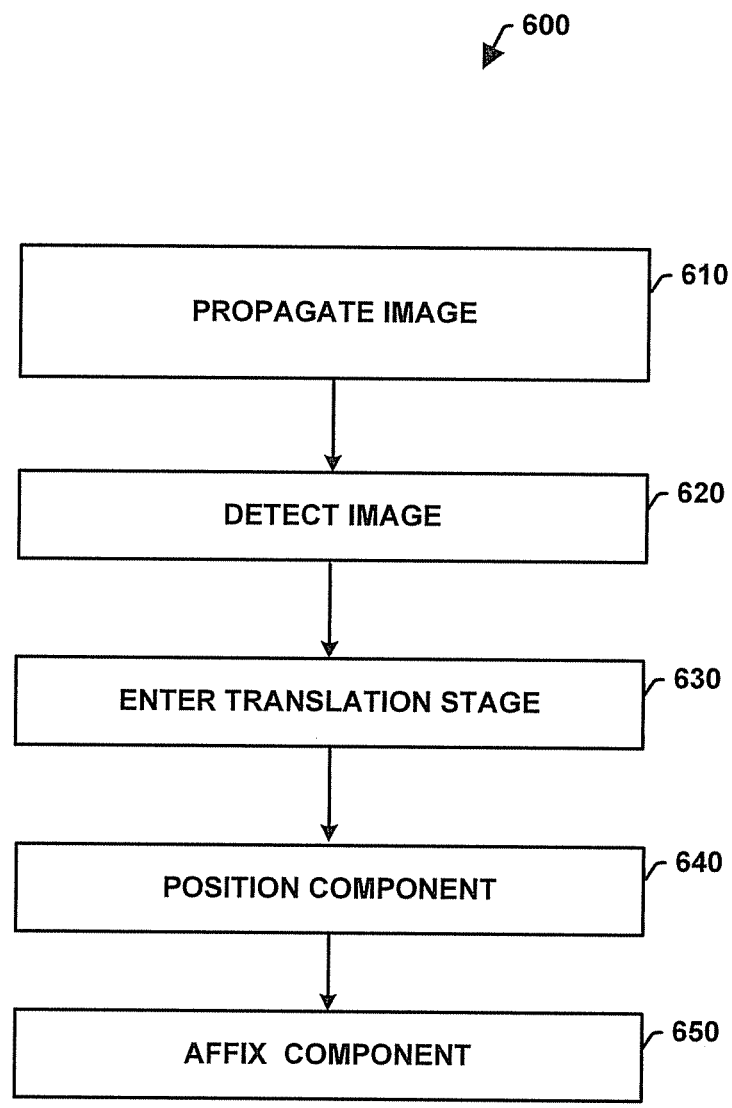
FIG. 6 illustrates an exemplary methodology for aligning components in an optoelectronic system in accordance with an aspect of the subject specification.

Referring next to FIG. 6, a flowchart of an exemplary methodology for aligning and affixing a substrate in an optical system is provided. As illustrated, process 600 begins at step 610 where an image (e.g. optical data, and/or collimated beam) propagates through a carrier (e.g., optic fiber, free space). Here, it is thus assumed that the image corresponds to an image gathered by an optic fiber or optoelectronic component.

Next, at step 620, process 600 with detecting an image. Here, it should be appreciated that a detecting an image can comprise detecting an image rendered at an end of a optic fiber or detecting an image modulated in a collimated beam. Further, one or more signals may be detected simultaneously, consecutively, and/or independently.

Once an image propagates and is detected, process 600 continues to step 630 where an image enters a translation stage. Here, it should be appreciated that such image may be translated via various mechanisms. In one aspect, a translation stage can comprise determining a position of a component corresponding to the image. In another aspect, the translation stage can comprise determining instructions to facilitate positioning of a component.

At step 640, process 600 continues to position a component. Positioning a component can comprise altering a position of a component along an x-axis, a y-axis, and/or a z-axis. Likewise, the altering can be relative. As such, a component can remain in a fixed position while other optical components are repositioned along x-axis, a y-axis, and/or a z-axis.

At step 650, process 600 concludes with affixing a component to another component. In an embodiment, step 650 utilizes an epoxy to connect a substrate to an engine, an optical fiber to a substrate, an optical fiber to another optical fiber, and the like.

Figure 7:
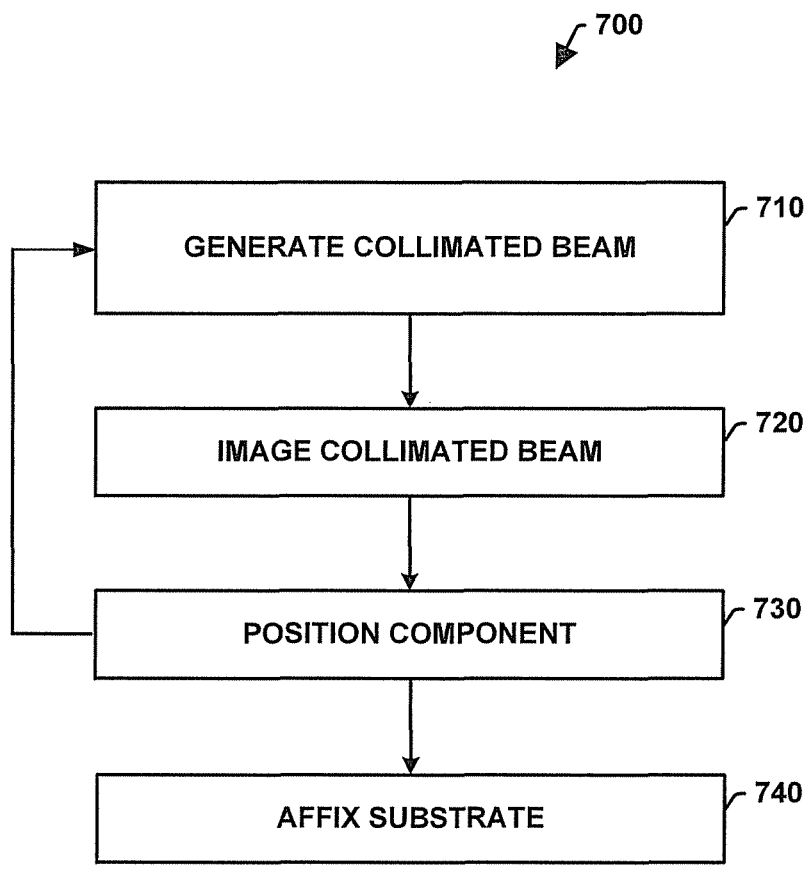
FIG. 7 illustrates an exemplary methodology for aligning components in an optoelectronic system utilizing a collimated beam in accordance with an aspect of the subject specification.

Turning to FIG. 7, a flowchart of an exemplary methodology for aligning optoelectronic components utilizing various aspects of this disclosure is provided. As illustrated, process 700 begins at step 710 where a collimated beam is generated. Here, it is thus assumed that said collimated beam is generated by a device configured in accordance with various aspects of this disclosure.

At step 720, process 700 continues with imaging the collimated beam. Here, it should be appreciated that a imaging the collimated beam can comprise refocusing, demodulating, decoding, and/or detecting a characteristic of the collimated beam. In one aspect, detecting a characteristic can comprise refocusing, demodulating, and/or decoding a collimated beam.

At step 730, process 700 continues to position a component based on positioning information derived from imaging the collimated beam. In one aspect, positioning can include altering components respective of a focal point.

At step 730, it can be determined if a new position of a component has met a target position. If not process 700 can repeat at step 710. If the position is aligned within a threshold, process 700 can continue to step 740.

At step 740, process 700 can conclude with affixing a component to another component. In an embodiment, step 740 utilizes an epoxy to connect a substrate to an engine, an optical fiber to a substrate, an optical fiber to another optical fiber, and the like. In another embodiment, step 740 utilizes various mechanical means to affix components.

Figure 8:
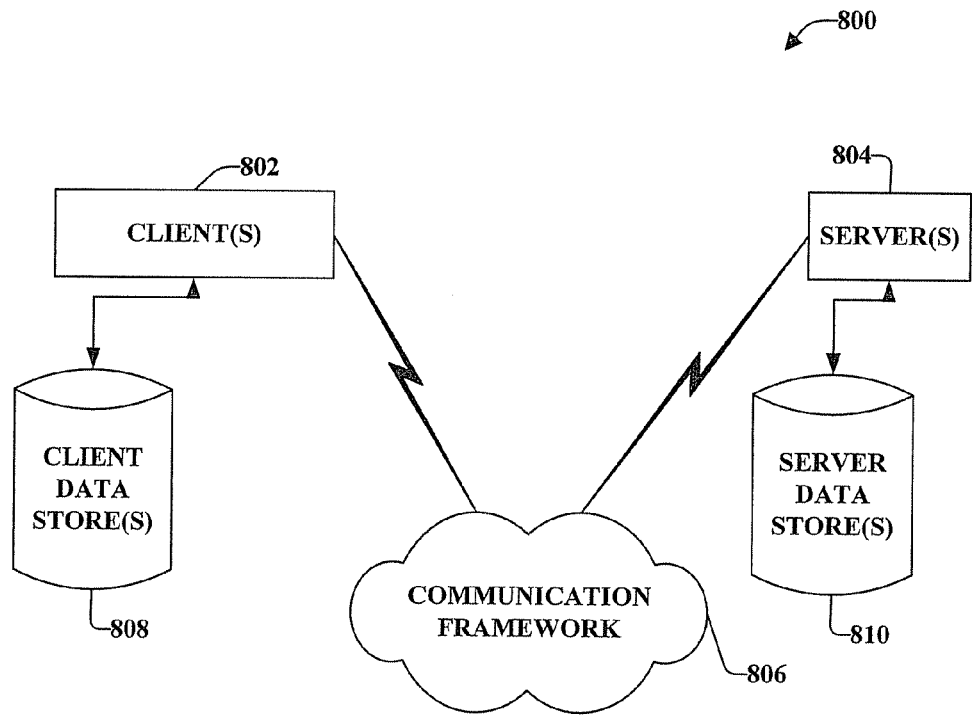
FIG. 8 illustrates an example schematic block diagram of a communication environment in accordance various aspects of this disclosure.

Referring now to FIG. 8, there is illustrated a schematic block diagram of a computing environment 800 in accordance with this specification. The system 800 includes one or more client(s) 810, (e.g., computers, smart phones, tablets, cameras, PDA's). The client(s) 810 can be hardware and/or software (e.g., threads, processes, computing devices). The client(s) 810 can house cookie(s) and/or associated contextual information. The client(s) 810 can communicate with servers(s) 804 via optical communication systems and/or methods in accordance with various aspects of this disclosure.

In one example, various components described in this disclosure can be configured to encompass client(s) 802, server(s) 804, client data store(s) 808, and/or server data store(s) 810. In another example, various systems and methods of this disclosure can be utilized to build and or maintain system 800.

The system 800 also includes one or more server(s) 804. The server(s) 804 can also be hardware or hardware in combination with software (e.g., threads, processes, computing devices). The server(s) 804 can house threads to perform transformations, for example. The server(s) 804 can also include various memory systems. One possible communication between a client 810 and a server 804 can be in the form of a data packet adapted to be transmitted between two or more computer processes wherein data may be accessed or stored in accordance with aspects of this disclosure. The data packet can include a cookie and/or associated contextual information, for example. The system 800 includes a communication framework 806 (e.g., a global communication network such as the Internet) that can be employed to facilitate communications between the client(s) 810 and the server(s) 804. In one example, communication framework includes various electromagnetic communication channels, in accordance with various aspects of this disclosure (e.g., optical communication systems and/or methods).

Communications can be facilitated via a wired (including optical fiber) and/or wireless technology. The client(s) 810 are operatively connected to one or more client data store(s) 808 that can be employed to store information local to the client(s) 810 (e.g., cookie(s) and/or associated contextual information). Similarly, the server(s) 804 are operatively connected to one or more server data store(s) 810 that can be employed to store information local to the servers 804.

In one implementation, a client 810 can transfer data or requests to a server 804. Server 804 can store the data, perform requests, or transmit the data or request to another client 810 or server 804. At various stages, system 800 can implement memory systems in accordance with this disclosure. For example, the client(s) 810 and the server(s) 804 can each implement one or more memory optical communication systems internally, in accordance with this disclosure.

Figure 9:
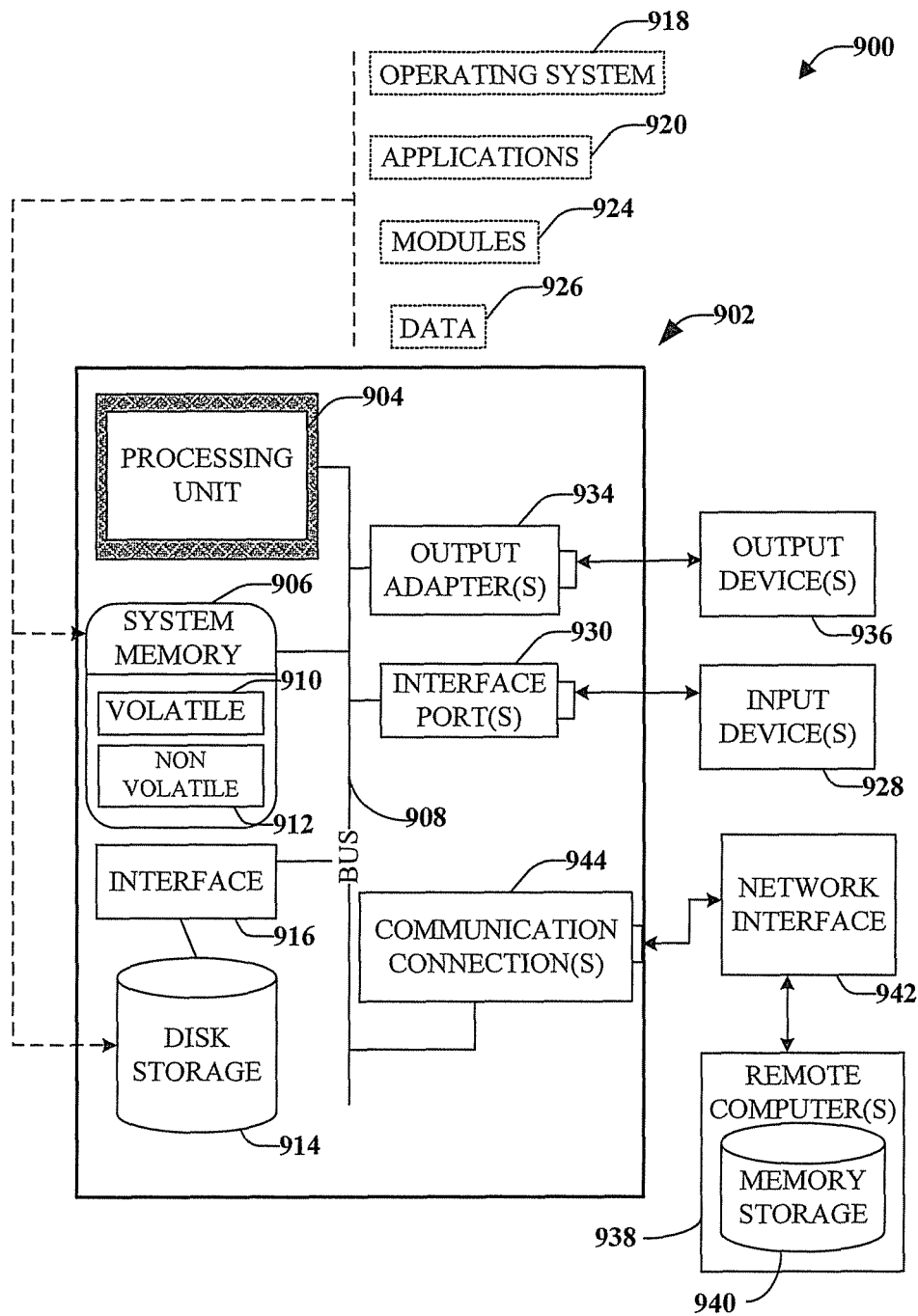
FIG. 9 illustrates an example block diagram of a computer operable to execute various aspects of this disclosure.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 can include volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRx SDRAM), and enhanced SDRAM (ESDRAM). Volatile memory 910 can implement various aspects of this disclosure, including memory systems containing MASCH components.

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software, software in execution, hardware, and/or software in combination with hardware that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems. For example, applications 920 and program data 926 can include software implementing aspects of this disclosure.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s), passive optical devices, and/or mechanical devices. Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., data storage and retrieval); software stored on a computer readable medium; or a combination thereof.

With respect to any figure or numerical range for a given characteristic, a figure or a parameter from one range may be combined with another figure or a parameter from a different range for the same characteristic to generate a numerical range.

Other than in the examples, or where otherwise indicated, all numbers, values and/or expressions referring to properties, characteristics, etc., used in the specification and claims are to be understood as modified in all instances by the term "about."

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
   a signaling component configured for processing an optical signal generated by an optoelectronic component while the optoelectronic component is active, wherein the optoelectronic component and an optic element are proximate to an alignment end of the signaling component; and
   an imaging component configured for:
      detecting an image at a terminal end of the signaling component, the image representative of the optoelectronic component while the optoelectronic component is not active, wherein the terminal end and the alignment end are different ends of the signaling component;
      determining a position of the optoelectronic component relative to the optic element as a function of the image; and
   a translation component configured for determining a target position based on the position of the optoelectronic component and a predetermined threshold; and
   a positioning component configured for altering a relative position of the optoelectronic component as a function of the target position and the position of the optoelectronic component.

2. The system of claim 1, wherein the target position comprises a focal point, and the optic element comprises a collimating lens.

3. The system of claim 1, wherein the target position comprises an alignment of the optoelectronic component relative to the alignment end of the signaling component, the signaling component is an optical fiber, and the optic element comprises the alignment end of the optical fiber.

4. The system of claim 1, wherein the signaling component comprises a collimated beam component configured for launching a collimated beam.

5. The system of claim 4, wherein the collimated beam component comprises one of a lens, a holographic optic array, or a mirror.

6. The system of claim 1, wherein the signaling component comprises an optic fiber.

7. The system of claim 6, wherein detecting the optical signal further comprises detecting an image at an end face of the optic fiber.

8. The system of claim 1, wherein the imaging component is further configured for identifying a pattern.

9. The system of claim 1, wherein the optoelectronic component comprises one of a substrate or an optical fiber.

10. A method of aligning optical systems, comprising:
    detecting, by an imaging component, an optical signal from a terminal end of an optical fiber, wherein the optical signal comprises at least in part light reflected from an optical component proximate to an alignment end of the optical fiber, wherein the alignment end and the terminal end are opposite ends of the optical fiber, and wherein the optic component is configured for processing an optical data signal for transmission through the optical fiber;
    determining, by the imaging component, a characteristic of the optical signal based at least in part on the light reflected from and not generated by the optical component;
    determining, by the imaging component, a position of the optical component at a source of the optical signal as a function of the characteristic of the optical signal;
    generating, by a translator component, repositioning instructions as a function of the position of the optical component and a target position; and
    altering, by a positioning component, the position of the optical component according to the repositioning instructions.

11. The method of claim 10 wherein determining a characteristic of the optical signal further comprises identifying a pattern in the light reflected from the optical component.

12. The method of claim 10, further comprising:
coupling the optical component to a second optical component.

13. The method of claim 10 further comprising:
iterating detecting the optical signal,
determining the characteristic,
determining the position,
generating the repositioning instructions, and
altering the position until the position of the optical component reaches the target position.

14. A communication system, comprising:
means for detecting an optical signal at a terminal end of a fiber optic cable, wherein the optical signal comprises an image of a first passive optical component, wherein the first passive optical component is at an alignment end of the fiber optic cable, and wherein the alignment end and the terminal end are opposite ends of the fiber optic cable;
means for identifying a characteristics of the optical signal;
means for determining a position of the first passive optical component relative to a second passive optical component, wherein the second passive optical component is proximate to the alignment end;
means for determining a target position based on the position of the first passive optical component and a predetermined threshold; and
means for repositioning the first passive optical component.

15. The system of claim 14 further comprising:
means for joining the first passive optical component and the second passive optical component.

* * * * *